United States Patent Office 3,410,916
Patented Nov. 12, 1968

3,410,916
5,6,7,8,11,11,12,12 - OCTACHLORO - 2,3,3a,4,4a,5,8,8a, 9,9a - DECAHYDRO - 2,3:4,9:5,8 - TRIMETHANO-1H - CYCLOPENTA(3a:9a) NAPHTHALENE
Herman A. Bruson, Woodbridge, and Howard L. Plant, Milford, Conn., assignors to Olin Mathieson Chemical Corporation, a corporation of Virginia
No Drawing. Filed May 31, 1966, Ser. No. 553,657
1 Claim. (Cl. 260—648)

ABSTRACT OF THE DISCLOSURE

Molecular equivalent quantities of hexachlorocyclopentadiene and the dichlorocarbene adduct of dicyclopentadiene are reacted at an elevated temperature to give the compound:

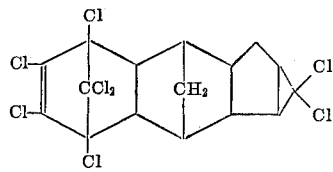

which can be employed in sprays or dusts to eradicate flies and mosquitoes, etc., and it is also useful as an additive for lubricating oils to improve load bearing properties.

---

This invention relates to the new compound 5,6,7,8,11, 11,12,12 - octachloro-2,3,3a,4,4a,5,8,8a,9,9a-decahydro-2, 3:4,9:5,8-trimethano-1H-cyclopenta(3a:9a) naphthalene having the Formula A.

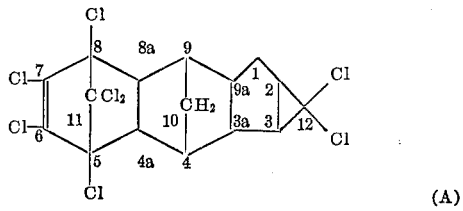

The above compound is toxic to flies, mosquitoes, roaches, ants, beetles, weevils, inch-worms, bed-bugs, caterpillars, spiders and other insects; and can be used in sprays or dusts to eradicate these and other pests.

The above substance is prepared according to this invention by heating hexachloro-cyclopentadiene with the dichlorocarbene adduct of dicyclopentadiene according to the equation:

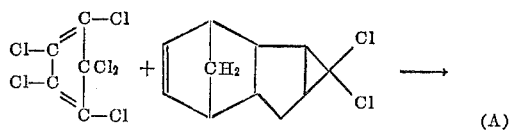

Preferably, the reaction is conducted in an inert atmosphere, such as an atmosphere of nitrogen, etc., and under refluxing conditions.

The synthesis of this novel compound is illustrated in the following non-limitative specific example:

Example

A mixture of (272.7 g.) (1 mole) hexachlorocyclopentadiene and 214 g. (1 mole) of endo-dicyclopentadiene-dichlorocarbene adduct (prepared according to the method of L. Ghosez, P. Laroche and L. Bastens, Tetrahedron Letters, No. 49, pp. 3745-3749 (1964), Pergamon Press Ltd.) was heated under a reflux condenser for 8 to 12 hours at 140–150° C. in an atmosphere of nitrogen. Upon cooling, the product crystallized to form a solid mass. After purification by recrystallization from glacial acetic acid, Compound A was obtained as colorless, fine crystals melting at 172.5° C.

Analysis.—Calc'd for $C_{16}H_{12}Cl_8$, percent: C, 39.45; H, 2.28; Cl, 58.27. Found, percent: C, 39.51; H, 2.48; Cl, 58.30.

The compound is readily soluble in petroleum naphtha and kerosene; aromatic hydrocarbons such as toluene, xylene, cumene; chlorinated hydrocarbons such as trichloroethylene, chlorobenzene and carbon tetrachloride, and in alcohol, ketone, and ester-type solvents.

When employed as a kerosene spray or as a dusting powder of talc containing 0.5 percent by weight of the above compound, it kills most insects within eight hours.

In addition, Compound A can be added to lubricating oils to improve load bearing properties. For example, a valuable extreme pressure lubricant composition can be prepared by adding from about 0.001 to about 10 percent by weight of Compound A, based on the weight of the entire composition, to a lubricating oil, such as mineral oil, or a silicone lubricating oil.

What is claimed is:
1. As a new compound, 5,6,7,8,11,11,12,12-octachloro-2,3,3a,4,4a,5,8,8a,9,9a - decahydro-2,3:4,9:5,8-trimethano-1H-cyclopenta(3a:9a) naphthalene of the formula:

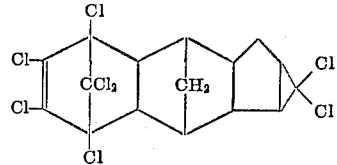

References Cited
UNITED STATES PATENTS
2,606,910  8/1952  Herzfeld.
3,012,079  12/1961  Bruson et al.

LEON ZITVER, Primary Examiner.
M. JACOB, Assistant Examiner.